(12) United States Patent
Malloy, III et al.

(10) Patent No.: US 12,243,661 B2
(45) Date of Patent: Mar. 4, 2025

(54) VALVE ASSEMBLY WITH ISOLATION VALVE VESSEL

(71) Applicant: BWXT mPower, Inc., Charlotte, NC (US)

(72) Inventors: John D. Malloy, III, Goode, VA (US); Michael J. Edwards, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 17/332,030

(22) Filed: May 27, 2021

(65) Prior Publication Data

US 2021/0287815 A1  Sep. 16, 2021

Related U.S. Application Data

(62) Division of application No. 15/663,376, filed on Jul. 28, 2017, now Pat. No. 11,043,310, which is a
(Continued)

(51) Int. Cl.
*G21C 9/00* (2006.01)
*G21C 13/036* (2006.01)
(Continued)

(52) U.S. Cl.
CPC ............... *G21C 19/04* (2013.01); *G21C 9/00* (2013.01); *G21C 13/036* (2013.01); *G21C 13/10* (2013.01);
(Continued)

(58) Field of Classification Search
CPC .......... F16K 15/18; F16K 17/003; G21C 9/00
See application file for complete search history.

(56) References Cited

U.S. PATENT DOCUMENTS 3,598,699 A * 8/1971 Hartman ................... G21C 9/00
422/198
3,779,865 A * 12/1973 Schafstall ............... G21C 9/00
976/DIG. 173

(Continued)

FOREIGN PATENT DOCUMENTS

JP   2013104867 A  *  5/2013

OTHER PUBLICATIONS

International Search Report and Written Opinion for PCT/US2013/036892 dated Sep. 30, 2013.

*Primary Examiner* — Lily C Garner
(74) *Attorney, Agent, or Firm* — Nelson Mullins Riley & Scarborough LLP

(57) ABSTRACT

Apparatuses for reducing or eliminating Type 1 LOCAs in a nuclear reactor vessel. A nuclear reactor including a nuclear reactor core comprising a fissile material, a pressure vessel containing the nuclear reactor core immersed in primary coolant disposed in the pressure vessel, and an isolation valve assembly including, an isolation valve vessel having a single open end with a flange, a spool piece having a first flange secured to a wall of the pressure vessel and a second flange secured to the flange of the isolation valve vessel, a fluid flow line passing through the spool piece to conduct fluid flow into or out of the first flange wherein a portion of the fluid flow line is disposed in the isolation valve vessel, and at least one valve disposed in the isolation valve vessel and operatively connected with the fluid flow line.

15 Claims, 4 Drawing Sheets

Related U.S. Application Data division of application No. 13/864,377, filed on Apr. 17, 2013, now Pat. No. 9,721,685.

(60) Provisional application No. 61/625,326, filed on Apr. 17, 2012.

(51) Int. Cl.
  G21C 13/10 (2006.01)
  G21C 19/04 (2006.01)
  *F16K 17/00* (2006.01)
  *G21C 19/30* (2006.01)

(52) U.S. Cl.
  CPC ............ *F16K 17/003* (2013.01); *G21C 19/30* (2013.01); *Y02E 30/30* (2013.01)

(56) References Cited

U.S. PATENT DOCUMENTS

| | | | | |
|---|---|---|---|---|
| 4,007,906 A * | 2/1977 | Karpenko | ............ | F16K 31/122 251/30.02 |
| 4,834,935 A * | 5/1989 | Daigle | ................ | G21C 13/032 376/292 |
| 4,836,443 A * | 6/1989 | Wolters | ................... | G21C 9/00 122/504 |
| 5,353,318 A * | 10/1994 | Gluntz | .................. | G21C 9/012 376/283 |
| 5,517,538 A * | 5/1996 | Seidelberger | ......... | F16K 17/383 137/72 |
| 5,577,085 A * | 11/1996 | Gou | ......................... | G21C 9/00 376/292 |
| 5,684,846 A * | 11/1997 | Meneely | .................. | G21C 9/00 376/293 |
| 6,810,099 B2 * | 10/2004 | Nakamaru | ............. | G21C 15/18 376/293 |
| 2003/0222235 A1 * | 12/2003 | Filkovski | ................ | F16K 31/12 251/30.01 |
| 2010/0124303 A1 * | 5/2010 | Young | .................... | G21C 15/26 376/282 |
| 2010/0181516 A1 * | 7/2010 | Palanchon | ......... | G05D 23/1333 251/324 |
| 2010/0316181 A1 * | 12/2010 | Thome | ................... | G21C 1/322 122/235.23 |
| 2011/0147016 A1 * | 6/2011 | Blease | .................. | A62C 35/68 137/517 |
| 2011/0284104 A1 * | 11/2011 | Riano Gutierrez et al. ................. G05D 7/0133 137/517 |
| 2013/0070887 A1 * | 3/2013 | Kim | ...................... | G21C 15/18 376/282 |
| 2016/0178067 A1 * | 6/2016 | Abouelleil | ................ | F16K 1/22 251/308 |
| 2017/0162281 A1 * | 6/2017 | Sato | ....................... | G21C 15/18 |
| 2017/0337994 A1 | 11/2017 | Malloy, III et al. | | |

\* cited by examiner

VALVE ASSEMBLY WITH ISOLATION VALVE VESSEL

CLAIM OF PRIORITY

This application is a divisional of U.S. patent application Ser. No. 15/663,376, filed Jul. 28, 2017, now U.S. Patent No. TBD, which is a divisional of U.S. patent application Ser. No. 13/864,377, filed Apr. 17, 2013, now U.S. Pat. No. 9,721,685, which claims the benefit of U.S. Provisional Application No. 61/625,326 filed Apr. 17, 2012, the entire disclosures of which are incorporated by reference herein.

BACKGROUND

The following relates to the nuclear power reactor arts, nuclear reaction coolant system arts, nuclear power safety arts, and related arts.

Light water nuclear reactors are known for maritime and land based power generation applications and for other applications. In such reactors, a nuclear reactor core comprising a fissile material (for example, $^{235}U$) is disposed in a pressure vessel and immersed in primary coolant water. The radioactive core heats the primary coolant in the pressure vessel, and the pressure vessel (or an external pressurizer connected with the pressure vessel by piping) includes suitable devices, such as heaters and spargers, for maintaining the primary coolant at a designed pressure and temperature, e.g. in a subcooled state in typical pressurized water reactor (PWR) designs, or in a pressurized boiling water state in boiling water reactor (BWR) designs. Various vessel penetrations take primary coolant into and out of the pressure vessel.

For example, in some PWR designs primary coolant is passed through large-diameter penetrations to and from an external steam generator to generate steam for driving a turbine to generate electrical power. Alternatively, an integral steam generator is located inside the reactor pressure vessel, which has advantages such as compactness, reduced likelihood of a severe loss of coolant accident (LOCA) event due to the reduced number and/or size of pressure vessel penetrations, retention of the radioactive primary coolant entirely within the reactor pressure vessel, and so forth. Additional smaller diameter vessel penetrations are provided to add primary coolant (i.e., a makeup line) or remove primary coolant (i.e., a letdown line). These lines are typically connected with an external reactor coolant inventory and purification system (RCIPS) that maintains a reservoir of purified primary coolant. Further vessel penetrations may be provided to connect with an external steam generator, an emergency condenser, or for other purposes.

Light water reactors are evaluated to determine their response in the event that a pipe outside of the reactor vessel breaks and a loss of coolant accident (LOCA) occurs. The compact integral reactor design was developed, in part, to minimize the consequence of an external pipe break by eliminating large-diameter piping leading to and from external steam generators. However, integral reactors still utilize small bore connecting piping that transports reactor coolant to and from the reactor vessel. For example, in reactors with an integral pressurizer the reactor vessel has penetrations at the top for pressurizer spray and venting. Some emergency core cooling system (ECCS) designs include piping connecting with an emergency condenser. The vessel also has makeup and letdown penetrations for coolant makeup, letdown, and decay heat removal. These lines run from the vessel to one of two valve rooms where isolation valves act to limit loss of water for breaks down stream of the valve rooms.

This arrangement results in three categories of LOCAs. Type 1 LOCAs result from a leak between the vessel and the valve room. Type 2 LOCAs result from a least at penetrations in the upper vessel. Type 3 LOCAs result from leaks that occur in the valve rooms. Type 2 and Type 3 LOCAs do not drain the reactor water storage tanks RWSTs at the end of the LOCA and result in long term cooling using the water left in the RWSTs. Type 1 LOCAs drain coolant into the refueling cavity, draining the RWSTs.

BRIEF DESCRIPTION

The present disclosure sets forth apparatuses for reducing or eliminating Type 1 LOCAs. In accordance with one aspect, a nuclear reactor comprises a nuclear reactor core comprising a fissile material, a pressure vessel containing the nuclear reactor core immersed in primary coolant disposed in the pressure vessel, and an isolation valve assembly including, an isolation valve vessel having a single open end with a flange, a spool piece having a first flange secured to a wall of the pressure vessel and a second flange secured to the flange of the isolation valve vessel, a fluid flow line passing through the spool piece to conduct fluid flow into or out of the first flange wherein a portion of the fluid flow line is disposed in the isolation valve vessel, and at least one valve disposed in the isolation valve vessel and operatively connected with the fluid flow line.

The spool piece and the isolation valve vessel can cooperatively define a sealed volume capable of withstanding an operating pressure of the pressure vessel of the nuclear reactor. The at least one valve can be a check valve preventing fluid flow out of the pressure vessel. The fluid flow line can be a makeup line for supplying reactor coolant to the pressure vessel and the at least one valve is a check valve preventing primary coolant from flowing out of the pressure vessel through the fluid flow line. The at least one valve can comprise at least two valves arranged in series on the fluid flow line. At least one valve can include an actuator for moving the valve between open and closed positions. The actuator can be an electric, hydraulic, pneumatic or manual actuator. The fluid flow line can be a letdown line that removes reactor coolant from the pressure vessel responsive to the actuator opening the at least one valve. An end of the fluid flow line can be disposed coaxially inside the spool piece. A redundant valve can be disposed outside of the isolation valve vessel and operatively connected with the fluid flow line.

In accordance with another aspect, an apparatus comprises an isolation valve assembly including an isolation valve vessel, a mounting flange sealing with the isolation valve vessel to define a sealed volume, a fluid flow line in fluid communication with the mounting flange to flow fluid through the mounting flange, and a valve disposed in the isolation valve vessel inside the sealed volume and operatively connected with the fluid flow line.

The isolation valve assembly can further include a forging including the mounting flange and a second flange to which the isolation valve vessel is secured, the forging having a passageway extending between the mounting flange and the second flange through which the fluid flow line passes. The valve can be a check valve allowing flow out of the mounting flange and blocking flow into the mounting flange. The valve can include first and second valves disposed in the isolation valve vessel inside the sealed volume and arranged in series along the fluid flow line. The isolation valve assembly can further include an external isolation valve disposed outside the isolation valve vessel and outside the sealed volume and operatively connected with the fluid flow line. The valve can include an actuator for moving the valve between open and closed positions. The actuator can be an electric, hydraulic, pneumatic or manual actuator.

The apparatus can further comprise a nuclear reactor comprising (i) a pressure vessel including a mating flange and (ii) a nuclear reactor core comprising fissile material disposed in the pressure vessel, wherein the mounting flange of the isolation valve is connected with the mating flange of the pressure vessel of the nuclear reactor. The fluid flow line can be a makeup line of a reactor coolant inventory and purification system (RCIPS) and the valve can be a check valve preventing backflow of reactor coolant from the pressure vessel into the makeup line. The fluid flow line can be a coolant letdown line of a reactor coolant inventory and purification system (RCIPS) and the valve can be an actuated valve.

In accordance with still another aspect, a nuclear reactor comprises a nuclear reactor core comprising a fissile material, a pressure vessel containing the nuclear reactor core immersed in primary coolant disposed in the pressure vessel, and an isolation valve assembly including a valve cover having a single open end with a flange, a spool piece including a first flange and a second flange secured with the flange of the valve cover to define a sealed volume enclosed by the valve cover, a fluid flow line passing through the spool piece and flowing fluid into or out of the first flange, and a valve supported in the sealed volume and operatively connected with the fluid flow line.

The reactor can further comprise a reactor coolant inventory and purification system (RCIPS), wherein the fluid flow line is a makeup line supplying makeup coolant water from the RCIPS to the pressure vessel and the valve is a check valve preventing backflow of coolant water from the pressure vessel to the RCIPS.

In another embodiment, the reactor can further comprise a reactor coolant inventory and purification system (RCIPS), wherein the fluid flow line is a letdown line and the valve is an actuated valve that is opened by an actuation signal to initiate flow of coolant water through the letdown line from the pressure vessel to the RCIPS.

DETAILED DESCRIPTION

Figure 1:
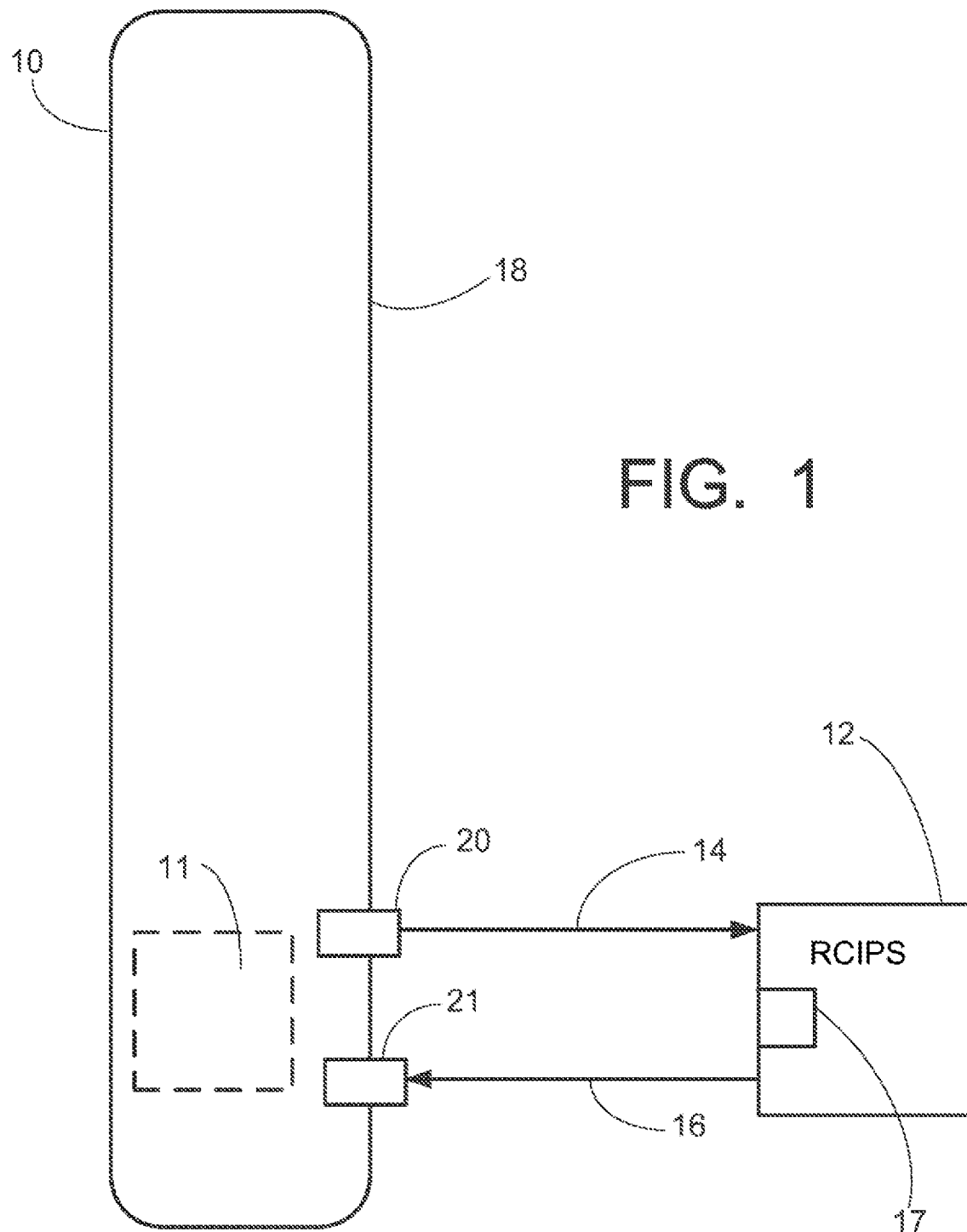
FIG. 1 is a schematic diagram of an exemplary nuclear reactor including a reactor vessel and a reactor coolant inventory and purification system (RCIPS).

FIG. 1 is a schematic illustration of a nuclear reactor including a pressure vessel 10. The pressure vessel 10 contains a nuclear reactor core 11 (shown in phantom) disposed at or near the bottom of the pressure vessel 10 and immersed in primary coolant water also disposed in the pressure vessel 10. The pressure vessel 10 further contains numerous internal components that are not shown in FIG. 1 but which are known in the art, such as structures defining a primary coolant flow circuit, e.g. a hollow cylindrical central riser defining a hot leg inside the riser and a cold leg in a downcomer annulus (e.g., flow region) defined between the central riser and the pressure vessel 10, and neutron-absorbing control rods and associated drive mechanisms for controlling reactivity of the nuclear reactor core. Some embodiments, e.g. integral pressurized water reactor (PWR) designs, also include one or more steam generators disposed inside the pressure vessel, typically in the downcomer annulus.

A reactor coolant inventory and purification system (RCIPS) 12 is provided to maintain the quantity and purity of primary coolant inside the pressure vessel. A letdown line 14 removes primary coolant water from the pressure vessel 10 into the RCIPS 12, and a makeup line 16 delivers makeup primary coolant water from the RCIPS 12 to the pressure vessel 10. The RCIPS 12 includes a pump 17 and other water processing components (not shown) for purifying and storing reserve primary coolant, injecting optional additives such as a soluble boron compound (a type of neutron poison optionally used to trim the reactivity), or so forth. Isolation valves 20, 21 are provided at respective vessel penetration locations where the letdown line 14 and makeup line 16, respectively, pass through an outer wall 18 of the pressure vessel 10. During ordinary operation, makeup water flows into, and/or letdown water flows out of, the pressure vessel 10 through the letdown line 14 and makeup line 16 to maintain desired operating volume and composition (e.g, purity) of the primary coolant water in the pressure vessel 10. However, if a break occurs in one of the fluid flow lines 14, 16, or elsewhere, such that a LOCA is initiated and uncontrolled primary coolant water discharge might occur, then flow of coolant out of the pressure vessel 10 is automatically blocked by the affected valve 20, 21.

Figure 2:
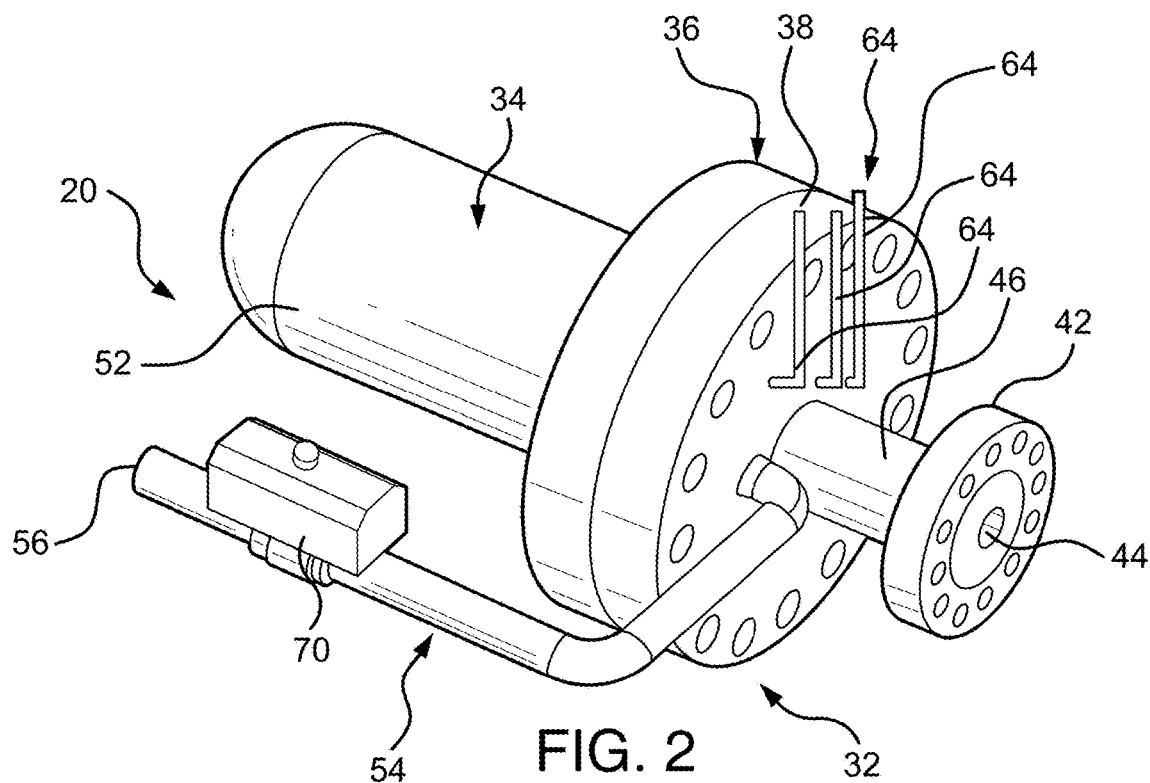
FIG. 2 is a perspective view of an exemplary vessel isolation valve in accordance with the present disclosure.

With reference to FIG. 2, an exemplary letdown isolation valve assembly 20 includes an isolation valve vessel (IVV) with a small pressure boundary containing redundant isolation valves. The pressure boundary is designed to withstand operating pressure and temperature conditions of primary coolant inside the pressure vessel 10. The isolation valve vessel is mounted to the side of the lower vessel with a flanged arrangement 32, which in the illustrative example is a spool piece 32. As used herein, a spool piece includes two flanges connected by piping or another passageway. The spool piece is rated to withstand the operating pressure of the pressure vessel 10, and in some embodiments the spool piece 32 is a forging. One flange of the spool piece 32 is connected with a mating flange of the pressure vessel 10 to connect the isolation valve assembly 20 directly to the wall 18 of the pressure vessel 10. The other flange of the spool piece 32 is connected with a flanged open end of the isolation valve vessel to define a sealed volume. Any leakage at the valves is contained within this sealed volume.

Figure 3:
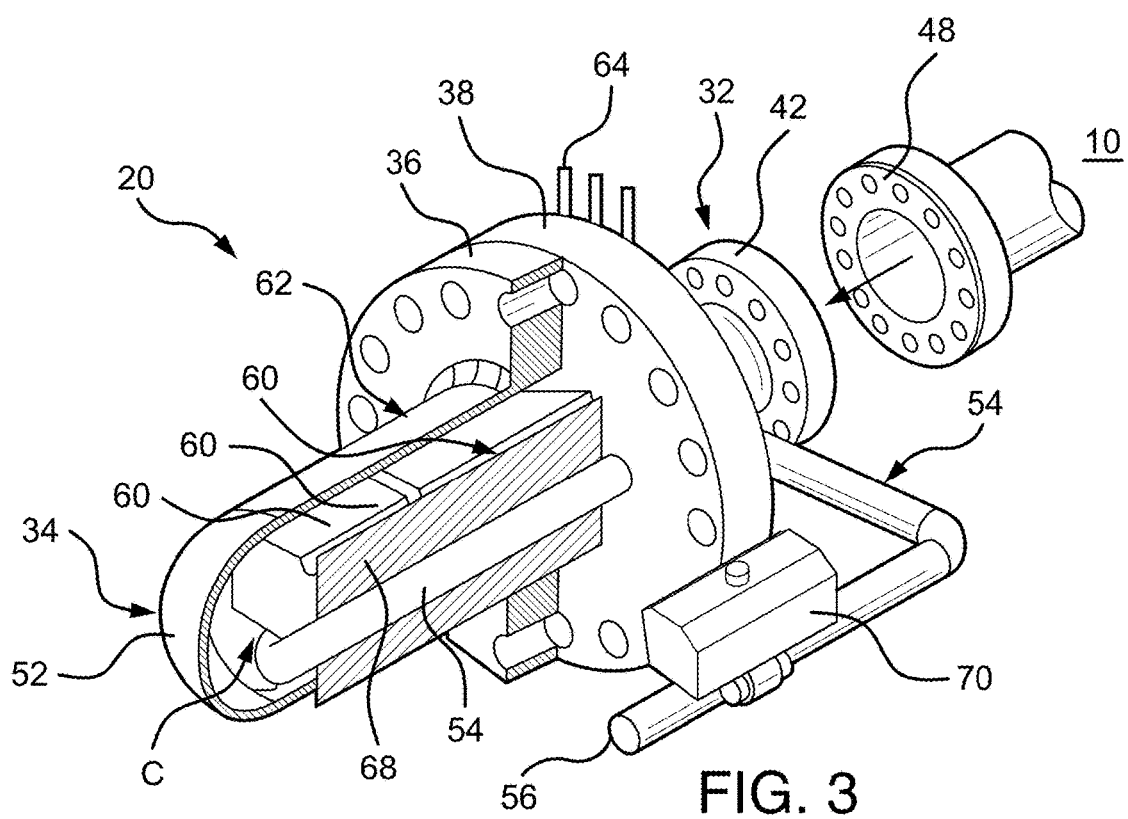
FIG. 3 is a perspective cutaway view of the isolation valve of FIG. 2.

With additional reference to FIG. 3, the details of the exemplary isolation valve assembly 20 in accordance with the disclosure will be described. The illustrated valve assembly 20 is a letdown isolation valve that can be used to control the flow of fluid out of the reactor core. However, it will be appreciated that the valve 20 could also be installed on a makeup line for adding fluid to the reactor core, or in another fluid line feeding into and/or out of the pressure vessel 10.

The valve 20 includes the spool piece 32 and an isolation valve vessel 34 secured together via a mating flange 36 at a (single) open end of the isolation valve vessel 34 and a flange 38 of the spool piece 32. The spool piece 32 also includes a mounting flange 42 having a centrally located inlet/outlet 44 and a plurality of bolt holes surrounding the inlet/outlet 44 for securing the valve assembly 20 to a mating flange 48 of a pressure vessel, such as pressure vessel 10. Thus, the spool piece 32 includes a first flange (namely the mounting flange 42) and a second flange (namely the flange 38 that connects with the isolation valve vessel 34). The spool piece 32 further includes a passageway 46 connecting the first and second flanges 42, 38. In the illustrative example, the mounting flange 42 is spaced apart from the flange 38 and connected by the passageway 46 which is a reduced diameter section. The isolation valve vessel 34 includes a hemispherical or elliptical head 52 (e.g., a valve cover) having flange 36 which connects with the flange 38 of the spool piece 32. The connection of the isolation valve vessel 34 and the flange 36 defines a sealed volume contained by the isolation valve vessel 34. A fluid flow line 54 includes a "U"-shaped portion disposed inside the isolation valve vessel 34 and then continues on coaxially inside the spool piece 32 to flow fluid into or out of the flange 42. In the illustrative example of letdown valve assembly 20, fluid flows from the pressure vessel 10 through the fluid flow line 54 and into the letdown line 14 (see FIG. 1) to reduce the quantity of primary coolant in the pressure vessel 10.

When the letdown valve assembly 20 is mounted to pressure vessel 10, the inlet/outlet 44 serves as an inlet that is in fluid communication with the interior of the pressure vessel 10 such that primary coolant can flow from the pressure vessel 10 through the letdown valve assembly 20 via valve fluid line 54 to an inlet/outlet 56 of the valve assembly 20. In the illustrative case of letdown valve assembly 20, the inlet/outlet 56 serves as an outlet that is connected to the letdown line 14 of the RCIPS 12. The illustrated "U"-shaped portion of the fluid flow line 54 inside the isolation valve vessel 34 advantagely accommodates thermal expansion.

Isolation valve vessel 34 together with the flange 38 define a sealed interior volume or chamber C in which a pair of valves 60 and 62 are supported. (In view of this, the hemispherical or elliptical head 52 is alternatively referred to herein as valve cover 52). In the illustrative example of letdown valve assembly 20 which is configured for a letdown application, the valves 60 and 62 are suitably actuated valves which are opened (or closed) by an actuation signal. Typically, it is preferable to have the valves 60, 62 be "normally closed" valves such that the actuation signal causes the valves to open so that the valves are closed in the passive state, although a "normally open" configuration is also contemplated. In some embodiments the valves 60, 62 are pneumatically actuated ball valves, although valves employing electrical, hydraulic, or manual actuation are also contemplated, as are valves other than ball valves.

In the makeup valve configuration (e.g., the makeup valve assembly 21 of FIG. 1), the valves 60 and 62 can be swing check valves or another type of check valve, which is configured to prevent fluid flow into the flange 42 (i.e., configured to prevent flow of primary coolant out of the pressure vessel 10). The valves 60 and 62 are arranged in series for redundancy, and it will be appreciated that additional valves, or a single valve, could be provided in the chamber C as desired. The isolation valve vessel 34 optionally includes various penetrations for the plant instrument air system to pressurize the chamber C for vessel leak testing, and for air lines 64 for piloting/actuating the pneumatic actuators in case of pneumatically actuated valves.

An optional internal support structure 68 is secured to flange 38 to support the actuated valves 60 and 62 (or to support the check valves in the case of makeup isolation valve assembly 21). The support structure 68 optionally also serves as a mechanical guide for installing the valve cover 52 so that it does not impact any internal components (e.g., valves and/or actuators, etc.) when it is removed and/or installed to allow maintenance access. Thermal insulation, although not illustrated, can be provided and its location will depend on the design of the actuator and/or position indicators. If high temperature actuators are utilized, the insulation can be placed on the outside of the support structure 68 and cover 52. If actuator temperature limitations prevent such positioning of the insulation, multi-layer metal insulation can be provided on the piping and a component cooling water line can be added to actively cool the valve 20 to assure acceptable temperatures. The support structure 68 is optional—in some embodiments the "U" shaped portion of the fluid flow line 54 has sufficient rigidity to support the valves 60, 62.

In the illustrated embodiment, an optional third isolation valve 70 disposed outside of the chamber C is provided to isolate the valve fluid line 54 in the event of a pipe break inside of the isolation valve vessel 34. The external valve 70 can be pneumatically operated, for example, and configured to close the valve fluid line 54 in the event of a leak within the valve 20. The third isolation valve 70 can be used, for example, to block flow through the valve fluid line in the event the other valves are disabled due to flooding of the chamber C during an internal pipe break and/or leakage event. Third isolation valve 70 provides a level of redundancy.

Figure 4:
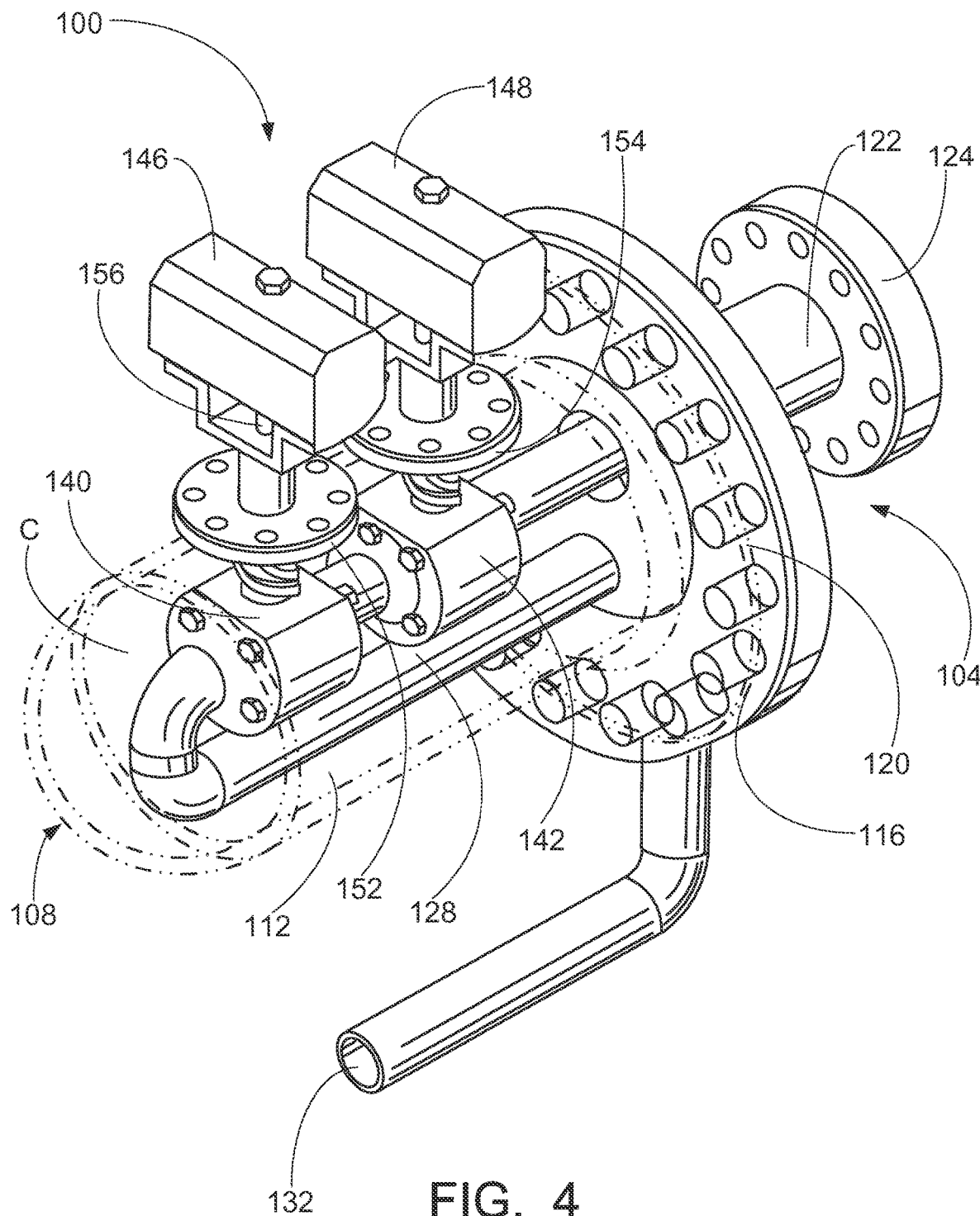
FIG. 4 is a perspective view of another exemplary isolation valve in accordance with the present disclosure shown with the isolation valve vessel in phantom to reveal interior components.
Figure 5:
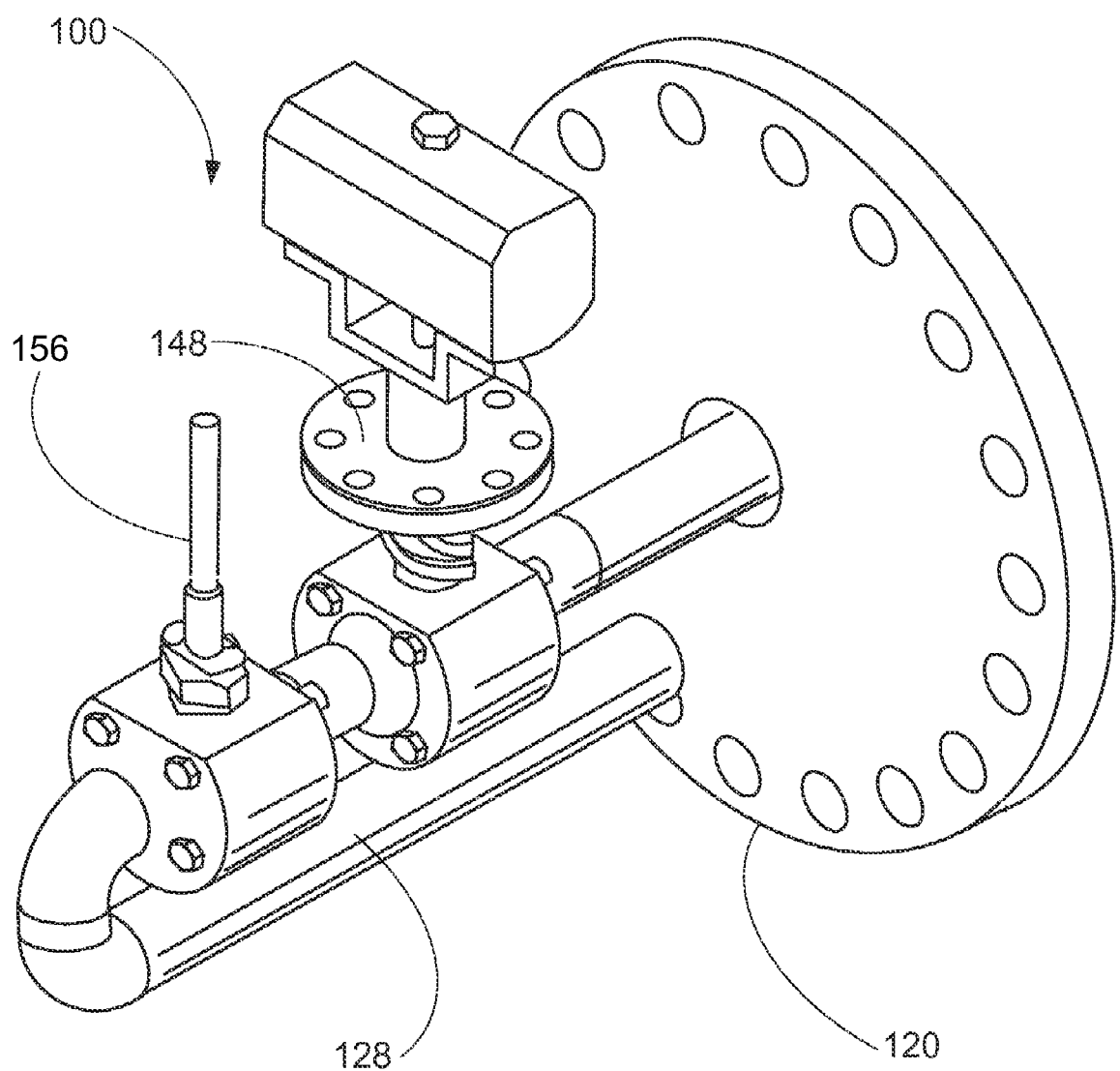
FIG. 5 is an enlarged view of a portion of the isolation valve of FIG. 4 with the valve vessel removed to expose the interior components of the isolation valve.

Turning to FIGS. 4 and 5, another exemplary isolation valve assembly 100 in accordance with the disclosure is illustrated. In this embodiment, the valve assembly 100 is similar to the valve assembly 20 of FIGS. 2 and 3. However, the valve assembly 100 has valves supported by the "U"-shaped portion of the fluid flow line (i.e., the support structure 68 is omitted), and valve actuators are mounted external to the pressure vessel. To this end, the valve 100 generally includes a spool piece 104 and an isolation valve vessel 108 comprising a valve cover 112 including a flange 116 that is removably secured to a mating flange 120 of the spool piece 104 with bolts or other fasteners (not shown). The valve assembly 100 is mountable to a pressure vessel of a nuclear reactor or other component via a mounting flange 124 of the spool piece 104 that is axially spaced from flange 120 of the spool piece 104 by a passageway 122. A fluid flow line 128 fluidly connects an inlet/outlet (not shown) of the mounting flange 124 with an inlet/outlet 132.

As with valve assembly 20, the valve assembly 100 includes an interior chamber C formed by the valve cover 112 and the flange 120 secured to the flange 120 of the spool assembly 104, and a pair of valves 140 and 142 are supported inside the chamber C. Valves 140 and 142 are supported by valve fluid line 128 and are arranged in series for redundantly blocking flow through the valve fluid line 128.

In embodiment of FIGS. 4 and 5, externally mounted valve actuators 146 and 148 are provided for actuating valves 140 and 142. To this end, the actuators 146 and 148 are mounted to respective actuator flanges 152 and 154 on the valve cover 112 with bolts or other suitable fasteners (not shown). A connecting shaft 156 (see FIG. 5) extends from the valves 140 through the valve cover 112 for coupling with the actuator 146. In one embodiment having ball valves, rotation of the connecting shaft 156 by the actuator 146 moves a ball of the valve 140 between respective open and closed positions. Valves 142 includes a similar configuration, although its connecting shaft is not visible in the drawings.

This configuration places the actuators 146, 148 outside of the relatively harsh environment of the chamber C, and therefore can increase component longevity and/or allow the use of conventional actuators. This generally simplifies the design and potentially eliminates the need for thermal insulation inside the pressure vessel. The connecting shafts for connecting the actuators to the valve member introduce the potential for some leakage around the connecting shafts, but leakage up to several gallons per minute or more can be accommodated while still achieving acceptable performance. As an alternative approach, a wireless actuation signal is also contemplated, which would eliminate the penetrations through the valve cover 112.

The isolation valve vessel of the present disclosure provides isolation for any pipe break of the makeup or letdown lines, assuming any active component failure. The makeup lines with check valves will automatically close if flow reverses, isolating the LOCA. The letdown lines require closure of the ball valves which is effected via the pneumatic actuators and occurs on a low RCS pressure signal.

Elimination of the low break LOCA simplifies design basis accident analysis and eliminates sump recirculation after a LOCA. The valves in the vessel would isolate the broken line and long term makeup and letdown would continue using the non-effected lines. Because of the limited volume of the vessel, the amount of debris that can flow into the RCS is significantly limited, reducing concerns of debris plugging of flow passages in the fuel assemblies.

It will now be appreciated that the present disclosure provides at least one or more of the following advantages:

1. Eliminates the two separate valve rooms used in conventional reactors.

2. Eliminates the Type 1 LOCA described above. Type 1 LOCA is generally considered the most difficult type of failure in which to provide long term cooling because most of the water spills on the refueling cavity floor. The RWST level drops to approximately 8 ft above the lower vessel penetrations minimizing the driving head to inject water.

3. The higher driving head allows greater flexibility in automatic depressurization valve sizing because very low differential pressures (e.g., less than 5 psi) are not required for long term injection.

4. During long-term cooling, there is a potential for water to flow through the break back into the reactor vessel. The invention limits the water that can flow back into the vessel and, because it is a closed structure, limits the amount of fibrous debris that can be mixed with the water.

5. By eliminating the Type 1 LOCA and its low passive injection pressure, the ADV and upper vessel penetration sizes may be reduced, making any upper breaks more benign.

6. The vessel reduces the length of ASME Class I piping.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus comprising:
an isolation valve assembly for use in conjunction with a nuclear reactor, the isolation valve assembly including:
an isolation valve vessel;
a mounting flange sealing with the isolation valve vessel to define a sealed volume;
a fluid flow line in fluid communication with the mounting flange to flow fluid through the mounting flange, the fluid flow line having a U-shaped portion inside the isolation valve vessel, the U-shaped portion having a first leg and a second leg alongside each other; and
a valve disposed in the isolation valve vessel inside the sealed volume and fluidly connected along the first leg of the U-shaped portion of the fluid flow line.

2. The apparatus of claim 1, wherein the valve includes first and second valves disposed in the isolation valve vessel inside the sealed volume and arranged in series along the fluid flow line.

3. The apparatus of claim 1, wherein the valve includes an actuator for moving the valve between open and closed positions.

4. The apparatus of claim 1, wherein the fluid flow line is a coolant letdown line of a reactor coolant inventory and purification system (RCIPS) and the valve is an actuated valve.

5. The apparatus of claim 2, wherein the first and second valves are both disposed along the first leg of the U-shaped portion of the fluid flow line.

6. The apparatus of claim 5, wherein the first and second valves each comprise a check valve.

7. The apparatus of claim 5, wherein the first and second valves each comprise an actuated valve.

8. The apparatus of claim 7, wherein the first and second valves each comprise pneumatically-actuated valves.

9. The apparatus of claim 8, wherein the first and second valves comprise ball valves.

10. The apparatus of claim 8, further comprising first and second connecting shafts respectively associated with the first and second valves, the connecting shafts extending through the isolation valve vessel.

11. The apparatus of claim 8, further comprising multiple air lines extending from said isolation valve vessel for operation of the first and second valves.

12. The apparatus of claim 7, wherein the first and second valves are normally closed.

13. The apparatus of claim 7, further comprising a third isolation valve mounted along a portion of the fluid flow line that is external to the isolation valve vessel.

14. The apparatus of claim 1, further comprising a spool piece having a first flange for connection with a pressure vessel and a second flange for securing to the mounting flange of the isolation valve assembly.

15. The apparatus of claim 1, wherein the isolation valve vessel has a rounded head at an end opposite the mounting flange.

* * * * *